(12) United States Patent
Imada et al.

(10) Patent No.: US 10,221,739 B2
(45) Date of Patent: Mar. 5, 2019

(54) PARTICULATE FILTER AND EXHAUST GAS PURIFIER

(71) Applicant: FUJITSU LIMITED, Kawasaki-shi, Kanagawa (JP)

(72) Inventors: Tadahiro Imada, Kawasaki (JP); Yoichi Kawano, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 15/373,440

(22) Filed: Dec. 8, 2016

(65) Prior Publication Data
US 2017/0204758 A1   Jul. 20, 2017

(30) Foreign Application Priority Data

Jan. 18, 2016   (JP) .................................. 2016-007381

(51) Int. Cl.
| | |
|---|---|
| *H01M 4/13* | (2010.01) |
| *C01B 32/168* | (2017.01) |
| *C12N 1/06* | (2006.01) |
| *H01M 4/48* | (2010.01) |
| *H01M 4/60* | (2006.01) |
| *F01N 3/028* | (2006.01) |
| *B01D 46/00* | (2006.01) |
| *F01N 13/14* | (2010.01) |

(52) U.S. Cl.
CPC ......... *F01N 3/028* (2013.01); *B01D 46/0063* (2013.01); *F01N 13/14* (2013.01); *B01D 2273/22* (2013.01)

(58) Field of Classification Search
None
See application file for complete search history.

(56) References Cited

U.S. PATENT DOCUMENTS

| | | | | |
|---|---|---|---|---|
| 4,233,351 A | * | 11/1980 | Okumura | B01J 35/04 428/116 |
| 4,255,316 A | * | 3/1981 | Blizzard | C08G 77/32 524/433 |
| 4,416,675 A | * | 11/1983 | Montierth | B01D 25/26 210/510.1 |
| 4,455,336 A | * | 6/1984 | Ogawa | B01D 46/2407 428/116 |
| 5,487,863 A | * | 1/1996 | Cunningham | B28B 3/269 264/177.11 |
| 5,750,026 A | * | 5/1998 | Gadkaree | B01D 39/2003 210/502.1 |
| 5,952,079 A | * | 9/1999 | Andou | B28B 3/269 210/500.21 |
| 6,040,266 A | * | 3/2000 | Fay, III | B01D 53/9454 423/445 R |

(Continued)

FOREIGN PATENT DOCUMENTS

| | | |
|---|---|---|
| JP | 04-298623 | 10/1992 |
| JP | 2003-201825 | 7/2003 |

(Continued)

*Primary Examiner* — Amber R Orlando
(74) *Attorney, Agent, or Firm* — Fujitsu Patent Center

(57) ABSTRACT

A particulate filter includes a particulate capturing body configured to capture particulates contained in exhaust gas, and a dielectric waveguide provided around the particulate capturing body. The effective relative permittivity of the dielectric waveguide is higher than the effective relative permittivity of the particulate capturing body.

11 Claims, 4 Drawing Sheets

(56) References Cited

U.S. PATENT DOCUMENTS

| | | | | |
|---|---|---|---|---|
| 6,217,832 | B1* | 4/2001 | Betta | F01N 3/2842 |
| | | | | 422/177 |
| 6,242,072 | B1* | 6/2001 | Ueda | B01D 53/885 |
| | | | | 264/631 |
| 7,678,348 | B2* | 3/2010 | Han | B01D 53/9418 |
| | | | | 422/180 |
| 7,989,047 | B2* | 8/2011 | Segawa | B32B 15/06 |
| | | | | 428/116 |
| 2001/0003728 | A1* | 6/2001 | Ito | B01J 35/04 |
| | | | | 502/439 |
| 2001/0006717 | A1* | 7/2001 | Domesle | B01J 35/04 |
| | | | | 428/116 |
| 2002/0022109 | A1* | 2/2002 | Ichikawa | B01J 35/04 |
| | | | | 428/116 |
| 2002/0044683 | A1* | 4/2002 | Deshpande | H04N 5/272 |
| | | | | 382/165 |

FOREIGN PATENT DOCUMENTS

| | | |
|---|---|---|
| JP | 2006-140063 | 6/2006 |
| JP | 2008-036080 | 2/2008 |
| JP | 2011-163341 | 8/2011 |
| JP | 2011-252387 | 12/2011 |

* cited by examiner

PARTICULATE FILTER AND EXHAUST GAS PURIFIER

CROSS-REFERENCE TO RELATED APPLICATION

This application is based upon and claims the benefit of priority of the prior Japanese Patent Application No. 2016-007381, filed on Jan. 18, 2016, the entire contents of which are incorporated herein by reference.

FIELD

A certain aspect of the embodiment discussed herein is related to particulate filters and exhaust gas purifiers.

BACKGROUND

Currently, exhaust gas purifiers that employ a diesel particulate filter (DPF) as a device to remove particulates contained in exhaust gas, such as particulate matter (PM), are put to practical use. During use of such exhaust gas purifiers, particulates such as PM deposit in the DPF, and accordingly, regeneration of the DPF is required. As methods of regenerating the DPF, for example, Japanese Laid-open Patent Publication Nos. 2006-140063, 2003-201825, and 2011-163341 propose methods that employ high-frequency electromagnetic waves such as microwaves. According to such methods, the DPF is exposed to electromagnetic waves such as microwaves to heat and burn particulates such as PM deposited on the DPF, so that the DPF is regenerated. Reference may also be made to Japanese Laid-open Patent Publication No. 2011-252387 for related art.

SUMMARY

According to an aspect of the invention, a particulate filter includes a particulate capturing body configured to capture particulates contained in exhaust gas, and a dielectric waveguide provided around the particulate capturing body. The effective relative permittivity of the dielectric waveguide is higher than the effective relative permittivity of the particulate capturing body.

The object and advantages of the invention will be realized and attained by means of the elements and combinations particularly pointed out in the claims.

It is to be understood that both the foregoing general description and the following detailed description are exemplary and explanatory and not restrictive of the invention.

DESCRIPTION OF EMBODIMENTS

Figure 1:
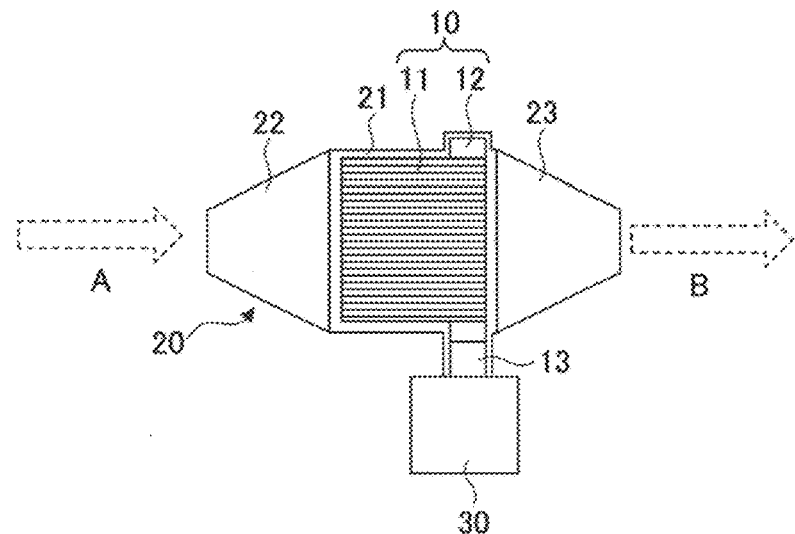
FIG. 1 is a diagram depicting a structure of an exhaust gas purifier according to an embodiment.

According to the above-described exhaust gas purifiers, the DPF is regenerated by being exposed to electromagnetic waves such as microwaves to cause particulates such as PM to be subjected to dielectric heating to be oxidatively decomposed. It is difficult, however, to make the intensity of emitted microwaves uniform in the DPF, thus causing an uneven intensity distribution of microwaves to cause temperature differences in the DPF. Therefore, the amount of removal of particulates such as PM may differ between regions in the DPF, thus resulting in incomplete regeneration of the DPF.

In particular, particulates such as PM are likely to deposit on the downstream side in the direction of the flow of exhaust gas in the DPF. Therefore, there is a demand for a regenerable particulate filter capable of efficiently removing particulates such as PM deposited on the downstream side in the direction of the flow of exhaust gas.

A preferred embodiment of the present invention will be explained with reference to accompanying drawings. The same member is referred to using the same reference numeral, and a repetitive description thereof is omitted.

Figure 2A:
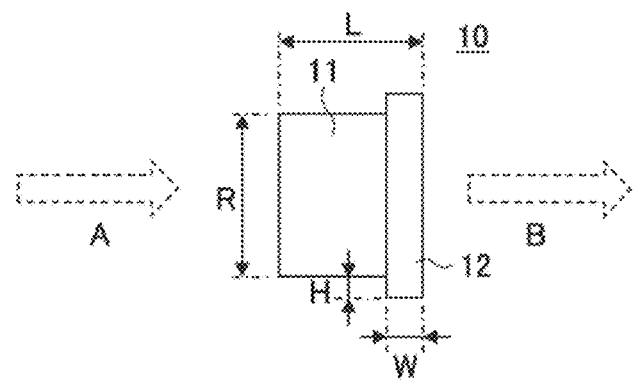
FIGS. 2A through 2C are diagrams depicting a particulate filter according to the embodiment.
Figure 2B:
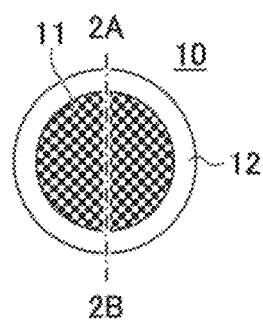
Figure 2C:
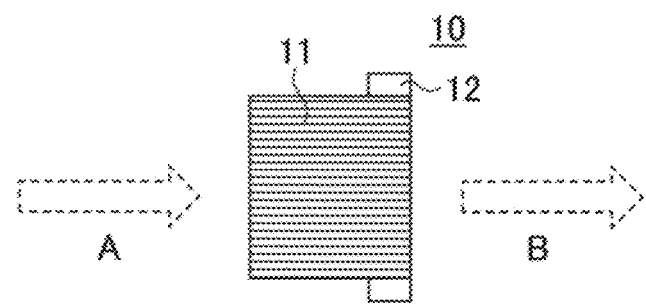

A particulate filter and an exhaust gas purifier according to this embodiment are described with reference to FIGS. 1 and 2A through 2C. FIG. 1 is a cross-sectional view of an exhaust gas purifier according to this embodiment, taken along a direction in which exhaust gas flows. FIGS. 2A and 2B are a side view and a front view, respectively, of a particulate filter according to this embodiment. FIG. 2C is a cross-sectional view of the particulate filter, taken along the one-dot chain line 2A-2B in FIG. 2B.

Referring to FIG. 1, the exhaust gas purifier of this embodiment includes a particulate filter 10, which is a particulate filter according to this embodiment, a housing 20, and a microwave generator 30. The particulate filter 10 serves as a particulate capturing part of the exhaust gas purifier. Referring to FIGS. 2A through 2C, the particulate filter 10 includes a particulate capturing body 11 to capture particulates and an annular dielectric waveguide 12 formed of a dielectric and provided around the particulate capturing body 11.

The particulate capturing body 11 includes a DPF. The DPF is formed of, for example, a honeycomb structure whose adjacent gas passage openings are alternately closed at each end to cause exhaust gas entering a gas passage through its entrance opening to exit from the exit opening of a gas passage different from the gas passage the exhaust gas has entered. In the drawings, the dashed arrow A indicates the direction of exhaust gas that enters the particulate filter 10 through its first end. Furthermore, the dashed arrow B indicates the direction of exhaust gas that exits from the particulate filter 10 through its second end opposite to the first end.

The particulate capturing body 11 and the dielectric waveguide 12 are formed of the same material, which is preferably cordierite. Furthermore, the effective relative permittivity is higher in the dielectric waveguide 12 than in the particulate capturing body 11. Specifically, the particulate capturing body 11, which is formed of a honeycomb structure whose adjacent gas passage openings are alternately closed at each end as described above, includes many spaces. Accordingly, even with the same material, the dielectric waveguide 12 can have an effective relative permittivity higher than that of the particulate capturing body 11 by having a porosity lower than that of the particulate capturing body 11.

For an effective passage of microwaves through the dielectric waveguide 12 to the particulate capturing body 11, the porosity of the dielectric waveguide 12 is preferably more than or equal to 30% and less than or equal to 80%. According to this embodiment, for example, the effective relative permittivity of the particulate capturing body 11 is 1.5 to 2.0, and the effective relative permittivity of the dielectric waveguide 12 is approximately 2.5.

According to the particulate filter 10, the particulate capturing body 11, which is, for example, cylindrical, has a length L of approximately 20 cm and a diameter R of 15 cm to 30 cm, and the dielectric waveguide 12 has a width W of more than or equal to 1 cm and less than or equal to 6 cm, for example, 5 cm, and a height H of approximately 2 cm.

The housing 20 is formed of a metal material such as stainless steel. The housing 20 includes a housing body 21 that covers a periphery of the particulate filter 10, and an inlet port 22 and an outlet port 23 connected to the housing body 21. According to the exhaust gas purifier of this embodiment, exhaust gas discharged from, for example, an engine flows in the direction indicated by the dashed arrow A to enter the housing 20 through the inlet port 22, and passes through the particulate filter 10 provided in the housing body 21 to be purified. Thereafter, the exhaust gas purified in the particulate filter 10 exits from the outlet port 23 in the direction indicated by the dashed arrow B.

According to the particulate filter 10, the dielectric waveguide 12 is provided near or at the downstream end of the particulate capturing body 11 in the direction of the flow of exhaust gas. For example, the dielectric waveguide 12 is provided around an end portion of the particulate capturing body 11 including its downstream end. This is because particulates such as PM are likely to deposit on the downstream side in the direction of the flow of exhaust gas in the particulate capturing body 11. A heat insulating material (not depicted) is provided between the housing 20 and the particulate filter 10, and the effective relative permittivity is higher in the dielectric waveguide 12 than in the heat insulating material. For example, according to this embodiment, the effective relative permittivity of the heat insulating material is approximately 2.0.

The microwave generator 30 and the dielectric waveguide 12 of the particulate filter 10 are connected by a dielectric connecting part 13. The dielectric connecting part 13 is formed of the same material and has the same porosity as the dielectric waveguide 12. Microwaves generated in the microwave generator 30 are supplied to the dielectric waveguide 12 through the dielectric connecting part 13, so that the inside of the particulate capturing body 11 is exposed to the microwaves from the dielectric waveguide 12.

A semiconductor device such as a high electron mobility transistor (HEMT) using nitride semiconductors is used for the microwave generator 30.

Figure 3:
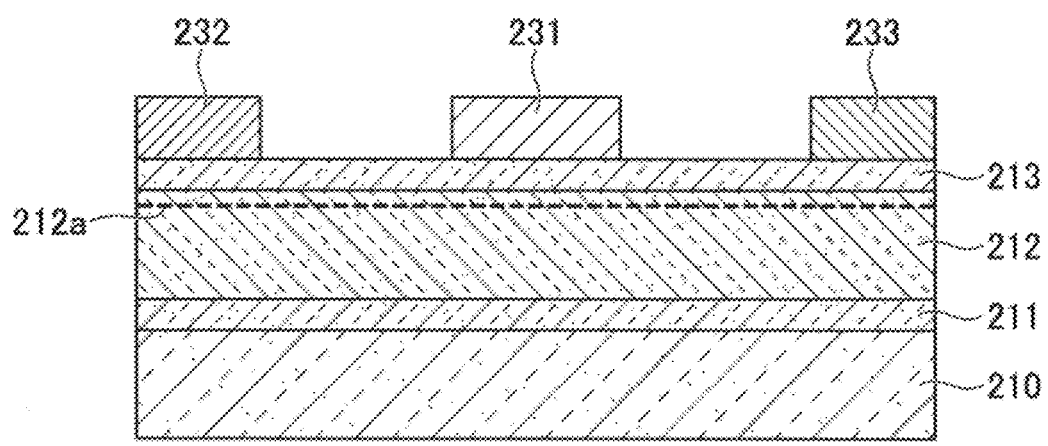
FIG. 3 is a diagram depicting a semiconductor device used in the exhaust gas purifier according to the embodiment.

FIG. 3 is a diagram depicting a semiconductor device used in the exhaust gas purifier of this embodiment. Referring to FIG. 3, the HEMT using nitride semiconductors is formed by stacking nitride semiconductor layers on a substrate 210 of, for example, Si or SiC. That is, a nucleation layer 211 formed of AlN, an electron transport layer 212, and an electron supply layer 213 are stacked in order on the substrate 210. The electron transport layer 212 is formed of GaN. The electron supply layer 213 is formed of AlGaN or InAlN. Thus, two-dimensional electron gas (2DEG) 212a is generated near the interface with the electron supply layer 213 in the electron transport layer 212. A gate electrode 231, a source electrode 232, and a drain electrode 233 are formed on the electron supply layer 213.

Next, the intensity distribution of microwaves in the case of exposing a particulate filter according to this embodiment to microwaves and the intensity distribution of microwaves in the case of exposing a conventional particulate filter to microwaves are described. According to particulate filters, the temperature becomes high in a region where the intensity of microwaves is high. Accordingly, the removal of particulates such as PM is accelerated particularly in a region where the intensity of microwaves is high.

Figure 4:
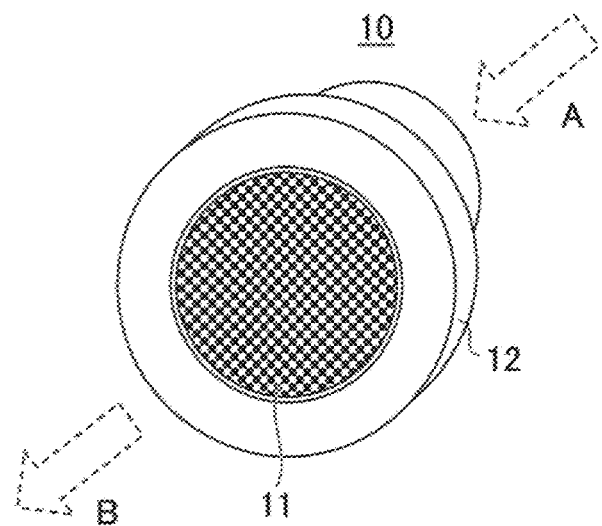
FIG. 4 is a perspective view of the particulate filter according to the embodiment.
Figure 5:
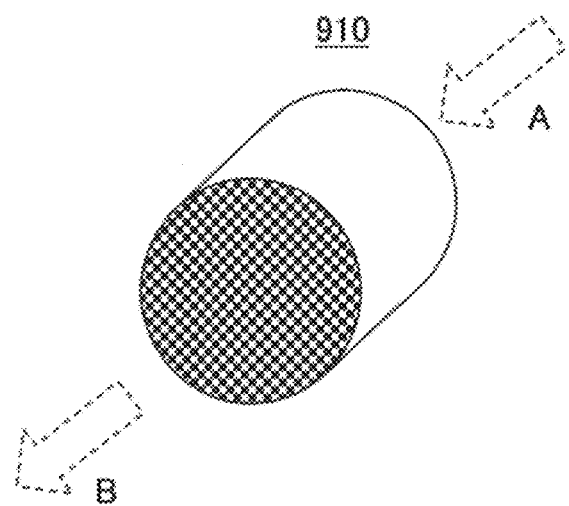
FIG. 5 is a perspective view of a conventional particulate filter.
Figure 6A:
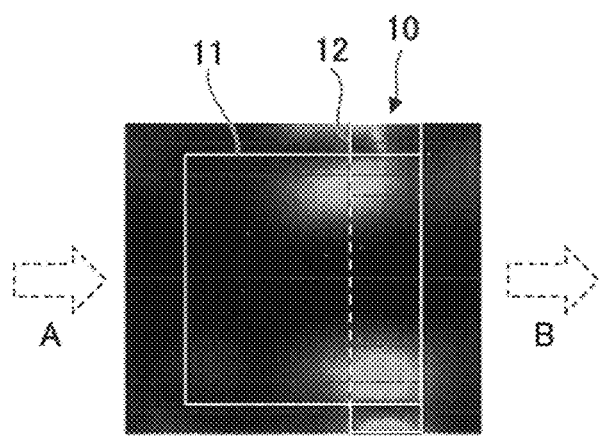
FIGS. 6A and 6B illustrate the results of a simulation of the particulate filter according to the embodiment.
Figure 6B:
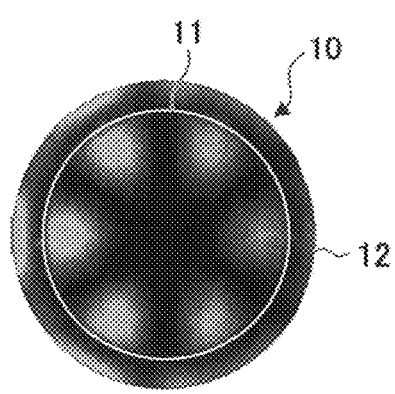
Figure 7A:
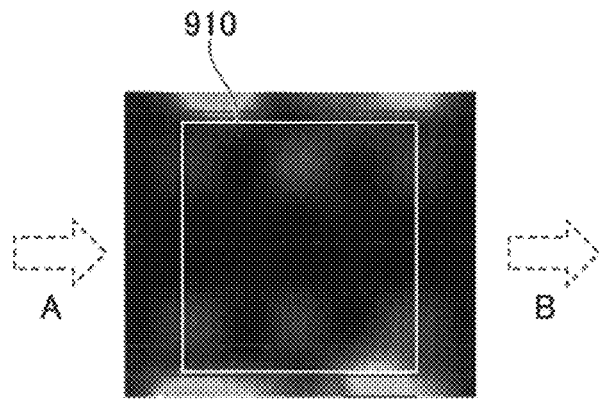
FIGS. 7A and 7B illustrate the results of a simulation of the conventional particulate filter.
Figure 7B:
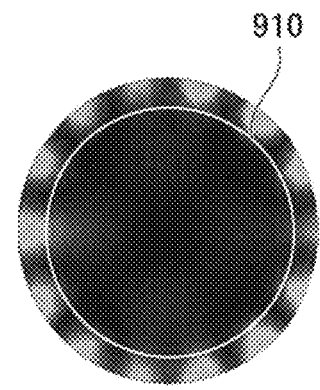

FIG. 4 is a perspective view of the particulate filter 10 according to this embodiment. FIG. 5 is a perspective view of a conventional particulate filter 910. FIGS. 6A and 6B illustrate intensity distributions of microwaves according to the particulate filter 10 of this embodiment depicted in FIG. 4. FIG. 6A illustrates an intensity distribution in the direction of the flow of exhaust gas. FIG. 6B illustrates an intensity distribution in a plane perpendicular to the direction of the flow of exhaust gas in the dielectric waveguide 12. FIGS. 7A and 7B illustrate intensity distributions of microwaves according to the conventional particulate filter 910 depicted in FIG. 5. FIG. 7A illustrates an intensity distribution in the direction of the flow of exhaust gas. FIG. 7B illustrates an intensity distribution in a plane perpendicular to the direction of the flow of exhaust gas in a downstream portion of the exhaust gas. In FIGS. 6A through 7B, a bright region is where the intensity of microwaves is high, and a darker region is where the intensity of microwaves is lower. FIGS. 6A through 7B illustrate the results of simulations in the case of emitting microwaves of a frequency of 2.45 GHz with a heat insulating material provided around the particulate filters 10 and 910. Exhaust gas flows in the direction indicated by the dashed arrow A to enter the particulate filters 10 and 910 and exits from the particulate filters 10 and 910 in the direction indicated by the dashed arrow B.

As illustrated in FIGS. 6A and 6B, the intensity of microwaves is higher in the particulate filter 10 of this embodiment than in the conventional particulate filter depicted in FIGS. 7A and 7B. In particular, according to the particulate filter 10 of this embodiment, the temperature is high in a downstream portion of the path of the flow of exhaust gas where the dielectric waveguide 12 is provided. Accordingly, it is possible to accelerate removal of particulates such as PM in a downstream portion of the path of the flow of exhaust gas where particulates such as PM are likely to deposit.

Thus, the particulate filter 10 of this embodiment includes the dielectric waveguide 12 to make it possible to increase the intensity of microwaves in a desired region in the particulate filter 10. Specifically, because particulates such as PM are likely to deposit in a downstream portion of the path of the flow of exhaust gas in particulate filters, the particulate filter 10 of this embodiment includes the dielectric waveguide 12 provided around the particulate capturing body 11 near or at its downstream end in the direction of the flow of exhaust gas. Therefore, according to the particulate filter 10, it is possible to increase the intensity of microwaves and accordingly to increase the temperature on the downstream side in the direction of the flow of exhaust gas, so that it is possible to efficiently remove particulates such as PM deposited on the downstream side in the direction of the flow of exhaust gas.

According to a particulate filter of an embodiment of the invention, it is possible to efficiently remove particulates such as PM in a DPF to regenerate the DPF.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A particulate filter, comprising:
    a cylindrical particulate capturing body configured to capture particulates contained in exhaust gas; and
    a dielectric waveguide provided around a cylindrical surface of the particulate capturing body,
    wherein an effective relative permittivity of the dielectric waveguide is higher than an effective relative permittivity of the particulate capturing body.

2. The particulate filter as claimed in claim 1, wherein the dielectric waveguide and the particulate capturing body are formed of a same material.

3. The particulate filter as claimed in claim 2, wherein the dielectric waveguide and the particulate capturing body are formed of a material including cordierite.

4. The particulate filter as claimed in claim 1, wherein the dielectric waveguide has a porosity of more than or equal to 30% and less than or equal to 80%.

5. The particulate filter as claimed in claim 1, wherein
    the exhaust gas enters the particulate capturing body through a first end thereof and exits from the particulate capturing body through a second end thereof, and
    the dielectric waveguide is provided around a portion of the particulate capturing body at the second end thereof.

6. An exhaust gas purifier, comprising:
    the particulate filter as set forth in claim 1;
    a housing including
        a housing body that covers the particulate filter; and
        an inlet port and an outlet port of the exhaust gas connected to the housing body; and
    a microwave generator configured to generate microwaves to which the particulate filter is exposed.

7. The exhaust gas purifier as claimed in claim 6, further comprising:
    a dielectric connecting part provided between and connecting the microwave generator and the dielectric waveguide, the dielectric connecting part being formed of a same material and having a same porosity as the dielectric waveguide.

8. The exhaust gas purifier as claimed in claim 6, wherein the microwave generator includes a semiconductor device formed of a nitride semiconductor.

9. The exhaust gas purifier as claimed in claim 8, wherein the nitride semiconductor is a material containing indium.

10. The exhaust gas purifier as claimed in claim 6, further comprising:
    a heat insulating material provided between the particulate filter and the housing body,
    wherein the effective relative permittivity of the dielectric waveguide is higher than an effective relative permittivity of the heat insulating material.

11. The particulate filter as claimed in claim 1, wherein the dielectric waveguide protrudes radially outward from the cylindrical surface of the particulate capturing body.

* * * * *